United States Patent
Cuillery

(10) Patent No.: US 9,149,158 B2
(45) Date of Patent: Oct. 6, 2015

(54) REMOVABLE GRIPPING DEVICE FOR A COOKING VESSEL WITH AN ANTI-RETURN MECHANISM CONSISTING OF A ROTATING TIGHTENING ARM

(71) Applicant: SEB S.A., Ecully (FR)

(72) Inventor: Pascal Cuillery, Faverges (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 14/190,947

(22) Filed: Feb. 26, 2014

(65) Prior Publication Data

US 2014/0239005 A1    Aug. 28, 2014

(30) Foreign Application Priority Data

Feb. 27, 2013    (FR) ...................................... 13 51707

(51) Int. Cl.
  *B65D 25/28*    (2006.01)
  *A47J 45/10*    (2006.01)

(52) U.S. Cl.
  CPC ....................................... *A47J 45/10* (2013.01)

(58) Field of Classification Search
  CPC ....... A47J 45/061; A47J 45/071; A47J 45/10; A47J 45/072
  USPC .......................................... 220/759, 753, 769
  See application file for complete search history.

(56) References Cited

U.S. PATENT DOCUMENTS

| | | | | |
|---|---|---|---|---|
| 3,269,765 | A * | 8/1966 | Pryce | 294/31.1 |
| 3,272,547 | A * | 9/1966 | Pryce | 294/31.1 |
| 3,422,485 | A * | 1/1969 | Pryce | 16/422 |
| 3,474,486 | A * | 10/1969 | Serio et al. | 220/759 |
| 4,577,367 | A * | 3/1986 | Durand | 220/759 |
| 6,257,439 | B1 * | 7/2001 | Hsu | 220/759 |
| 2008/0110910 | A1 * | 5/2008 | Kleppin | 220/759 |
| 2009/0193626 | A1 * | 8/2009 | Boes | 16/425 |
| 2013/0140321 | A1 * | 6/2013 | Montgelard | 220/752 |
| 2014/0103672 | A1 * | 4/2014 | Baumgarten et al. | 294/31.1 |
| 2014/0158698 | A1 * | 6/2014 | Bonnel et al. | 220/573.1 |

FOREIGN PATENT DOCUMENTS

| | | |
|---|---|---|
| FR | 2818885 A1 | 7/2002 |
| FR | 2936403 A1 | 4/2010 |
| WO | 2009/136678 A1 | 11/2009 |

* cited by examiner

*Primary Examiner* — Robert J Hicks
*Assistant Examiner* — Niki Eloshway
(74) *Attorney, Agent, or Firm* — The Webb Law Firm

(57) ABSTRACT

The device comprises an internal support upper arm and an external support lower arm, designed to work together so that, by gripping, the upper arm and the lower arm push against an internal face and an external face, respectively, of the lateral vessel wall; a tightening arm which rotates around an axis between an unlocked and a locked position in which the tightening arm pushes against the lateral wall and works with one of the two lower and upper arms to pin the lateral wall against at least one of the arms; and movement means designed to manually shifted between an open and closed position and to rotate the tightening arm when moving from an open to a closed position. In addition, provision is made of anti-return means, separate from the movement means, for blocking the rotation of the tightening arm in the opposite direction from the tightening direction when said tightening arm is in the locked position.

19 Claims, 3 Drawing Sheets

REMOVABLE GRIPPING DEVICE FOR A COOKING VESSEL WITH AN ANTI-RETURN MECHANISM CONSISTING OF A ROTATING TIGHTENING ARM

CROSS-REFERENCE TO RELATED APPLICATION

This application claims priority to French Application No. 1351707 filed Feb. 27, 2013, the disclosure of which is hereby incorporated in its entirety by reference.

BACKGROUND OF THE INVENTION

1. Field of the Invention

The invention concerns a removable gripping device for a cooking vessel.

More specifically, the gripping device of the invention includes
  an upper arm for internal support and a lower arm for external support, designed to work together so that, by gripping, the upper and lower arms push against the internal face and external face, respectively, of the lateral wall;
  a mobile tightening arm which rotates on an axis between unlocked and locked positions, in which the tightening arm pushes against the lateral wall and works together with at least one of the two lower and upper arms to pin the lateral wall against at least one of these two arms.

2. Description of Related Art

A gripping device of this type is, described, inter alia, in document FR 2 936 403. To mount the gripping device on a vessel, the user orients the device to place the lateral vessel wall against the upper and lower arms. The user then tightens the tightening arm which, by rotating, moves closer to the upper arm and pushes against the vessel wall to lock it between the upper arm and the mobile tightening arm in a tightened position. The device is then locked using a locking finger. This tightening applies a tightening force with a vertical component, which is useful when moving the vessel vertically when, for example, sautéing or flipping crêpes. The tightening force may be limited because shocks caused by use are directly counteracted by the tightening force. However, shocks applied to a frying pan in use tend to move the mobile arm from its tightened position. Only the locking finger prevents this effect. To eliminate play, the locking position must coincide with the tightening position. However, in practice, the locking position is reached either prior to or after the tightened position. In the first case, there is play between the vessel wall and the gripping device. In the second case, this leads to hyperstatism in the mobile tightening arm, which is absorbed by components elasticity. Despite everything, if sufficiently strong shocks are applied to the vessel, these components, which are highly stressed, may be compromised, resulting in play.

As a result, tightening walls with varying thicknesses is only possible by allowing play in operation depending on the potential difference in thickness between different vessels. This play may be reduced by an elastic element. But the compression of this elastic element induced by sufficiently strong shocks may also strip the gripping device.

Furthermore, play between the gripping device and the cooking vessel results, to some degree, in premature aging of the vessel coating in the vicinity of the tightening zone. This coating, in particular enamels, may also be damaged by excessive tightening to avoid this play. Finally, and more importantly, play could strip the container, which creates a safety problem.

SUMMARY OF THE INVENTION

This invention improves this situation. To do so, the invention relates to a removable gripping device for a cooking vessel in which the vessel contains a lateral wall with:
  an upper internal support arm and a lower external support arm, which are designed to work together so that, by gripping, the upper and lower arms push against the internal and external faces, respectively, of the lateral wall;
  a tightening mobile arm which rotates around an axis between an unlocked and locked position in which the tightening arm pushes against the lateral wall and works with one of the two lower and upper arms to pin the lateral wall against at least one of the arms;
  moving mechanisms which can be manually moved between an open and closed position and can rotate the tightening arm when shifting from the open to the closed position;
  including an anti-return mechanism, separate from moving mechanisms, to prevent the rotation of the tightening arm in the opposite direction from the tightening direction when the tightening arm is in a locked position.

Accordingly, the tightening arm in the locked position is prevented from turning in the opposite direction from the tightening direction by the anti-return mechanism. This mechanism continuously prevents the return of the tightening arm, in contrast to a locking finger which acts incrementally. This significantly limits the play between the gripping device and the vessel.

The device advantageously includes an unblocking member which can be manually controlled to shift the anti-return mechanism between the blocking and unblocking positions.

Accordingly, to remove the gripping device, the unblocking member can be triggered to unblock the anti-return mechanism.

The anti-return mechanism advantageously operates as an arch lever.

In a special embodiment, the anti-return mechanism consists of a freely rotating wheel device.

The freely rotating wheel device allows the rotation of the tightening arm to be simply and effectively blocked in only one direction, i.e., the opposite direction from the tightening direction.

Advantageously still, the anti-return mechanism can block the rotation of the tightening arm in the opposite direction from the tightening direction when the tightening arm is rotated from the unlocked to the locked position.

In a special embodiment, the anti-return mechanism comprises rolling elements between the rotation axis of the tightening arm, which is fixed, and a ring, which is connected in rotation to the tightening arm and configured so that it can blocked from rotating in the opposite direction from the tightening direction by pinching of the rolling elements between the ring and the rotation axis.

In this case, the rolling elements are advantageously mounted on a cage connected to the tightening arm by connection mechanisms which allow the cage to rotate when the tightening arm is rotated from its unlocked to its locked position.

Therefore, the anti-return effect is generated by using rolling elements, for example, rollers or ball bearings, which work with a ring connected in rotation to the tightening arm to form a freely rotating wheel device.

Advantageously still, the connection mechanisms between the tightening arm and the cage comprise elastic mechanisms under the action of which the rolling elements are kept in contact with the ring when the tightening arm is rotated from its unlocked to its locked position. Accordingly, when the tightening arm is rotated in the tightening direction, the rolling elements follow the rotation movement simply through contact with the ring.

This prevents rotation of the tightening arm in the opposite direction because, in this case, the rolling elements are pinched between the ring and the axis.

In a special embodiment, it includes a locking piece which works with a finger attached to the cage so that, when the tightening arm is rotated from its unlocked position to its locked position, the finger, which also rotates, moves said locking piece in translation in a first direction until it reaches a locking position in which said locking piece locks the movement mechanism in a closed position. The locking piece locks the movement mechanism in a closed position.

In this case, the locking piece advantageously creates an opening so positioned that it can accept a hooking head which is part of the movement mechanism when the locking piece is in a locked position.

The locking piece thereby plays a dual role of locking/unlocking the closure of the movement mechanism and unblocking the anti-return mechanism.

Advantageously still:
the unblocking member is designed to move the locking piece in translation in a second direction effecting, through the finger, a rotation of the cage to disengage the rolling elements; this disengagement of the rolling elements releases the tightening arm to rotate in the opposite direction from the tightening direction;
the device includes first elastic return mechanisms designed to return the locking piece in the second direction, the return of locking piece in the second direction releasing the hooking head;
the device includes second elastic return mechanisms to return the movement mechanism to the open position after the release of the hooking head;
the rolling elements are rollers;
the rolling elements are ball bearings;
the movement mechanism includes a finger tappet through which said movement mechanisms cause a rotation of the tightening arm in the tightening direction;
the finger tappet is connected to the movement mechanism using the elastic mechanisms;
the tightening arm is designed to pin the vessel wall against the internal support upper arm.

The invention also relates to a design having a gripping device as previously defined and a cooking vessel.

BRIEF DESCRIPTION OF THE DRAWINGS

The invention will be better understood using the following description of a removable gripping device of a cooking vessel according to a special embodiment, with reference to the attached diagrams in which.

DESCRIPTION OF THE INVENTION

Figure 1:
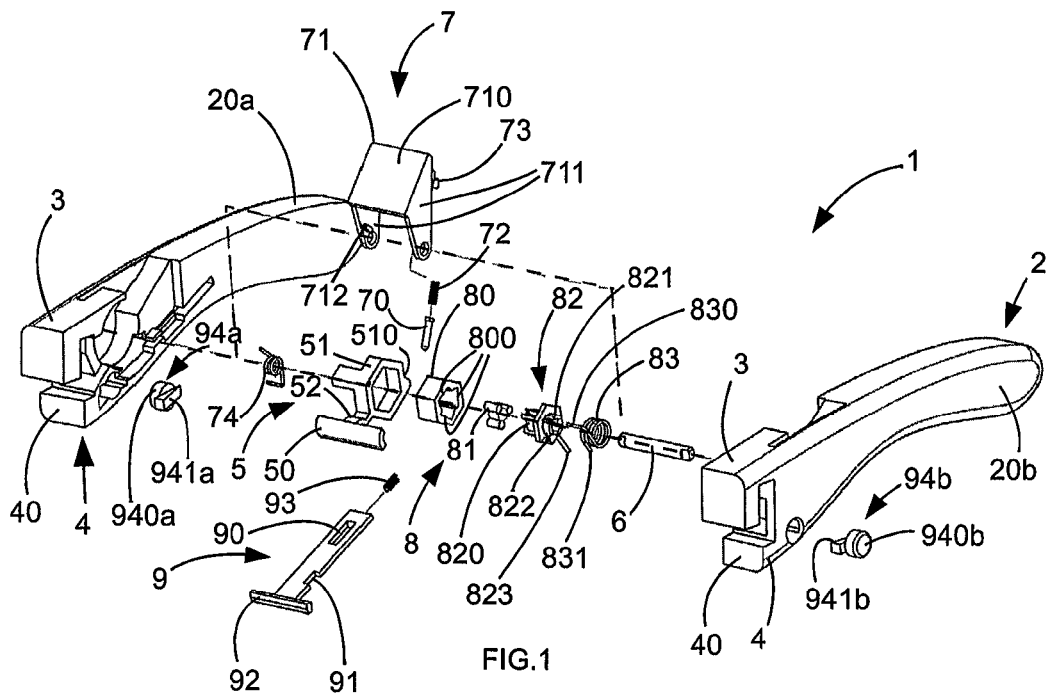
FIG. 1 represents an exploded view of the gripping device according to a special embodiment.

The Figures show removable gripping device 1, usually called "handle" or "removable handle", according to a first exemplary embodiment. Device 1 is designed to be mounted on a cooking vessel's lateral wall, then removed, by a user, to ease storing the cooking vessel. Once mounted on the cooking vessel, device 1 allows it to be moved.

The cooking vessel may be a casserole, frying pan, hot pot, sauce pan, or any other cooking utensil provided with a gripping handle. In any event, this vessel has a lateral wall on which gripping device 1 may be mounted and removed.

It is important to note that, in the following description, the terms "horizontal", "vertical", "lower", "upper", "longitudinal", "transversal", "high", "low", "front", and "rear", are used to describe gripping device 1 by referring to this device 1 in use when it is mounted on a cooking vessel's lateral wall, which is placed on a horizontal surface.

Gripping device 1 includes gripping body 2, or a sleeve, which extends mainly along longitudinal axis A1. This gripping body 2 consists of two lateral sections, 20a, 20b, which run longitudinally, and which are essentially symmetric to one another relative to a median vertical assembly plane (not shown), labeled PM, which includes axis A1. The two sections 20a, 20b are assembled in median plane PM by screws, glue, solder, or any other appropriate assembly technique.

Gripping body 2 includes a rear free end section and a front fixation section.

The front fixation section includes upper arm 3 for internal support and lower arm 4 for external support. Upper arm 3 runs toward the front along the upper portion of gripping body 2 and is curved at the bottom of its free end to create, at the rear, internal support surface 30 designed to be supported against an internal face of the vessel's lateral wall. Lower arm 4 runs along the bottom of the gripping body and creates in front external support surface 40 designed to be supported against an external face of the vessel's lateral wall.

Internal support surface 30 is flat here. External support surface 40 is slightly concave in order to match an external face a cylindrical wall of the vessel. The plane (not shown) along, which internal support surface 30 extends and the plane (not shown) tangent to the external support surface 40 and perpendicular to median plane PM of device 1 are denoted P1 and P2, respectively. Planes P1 and P2 are parallel and slightly displaced from one another longitudinally.

The space created between upper arm 3 and lower arm 4, in front of gripping body 2, constitutes housing 21 for receiving the lateral wall of the cooking vessel.

Device 1 also includes tightening arm 5, mounted to rotate around axis 6 which is part of body 2, via anti-return system 8, which will be explained below. Axis 6 is fix-mounted on gripping body 2 in a transverse direction (i.e., orthogonally to median plane PM). Tightening arm 5 includes front support element 50 and rear ring 51, which are attached to one another and connected by arm 52. In the example described here, front support element 50, ring 51 and arm 52 are part of a single component.

Front support element 50 is designed to push against the external face of the vessel wall and to pin this wall against upper arm 3. It is shaped as part of a cylinder with a transverse axis (orthogonal to median plane PM), the convex surface of which points generally toward upper arm 3. Here, the ring 51 has a hexagonal shape and rotates around axis 6. It includes rear support ledge 510.

Figure 2:
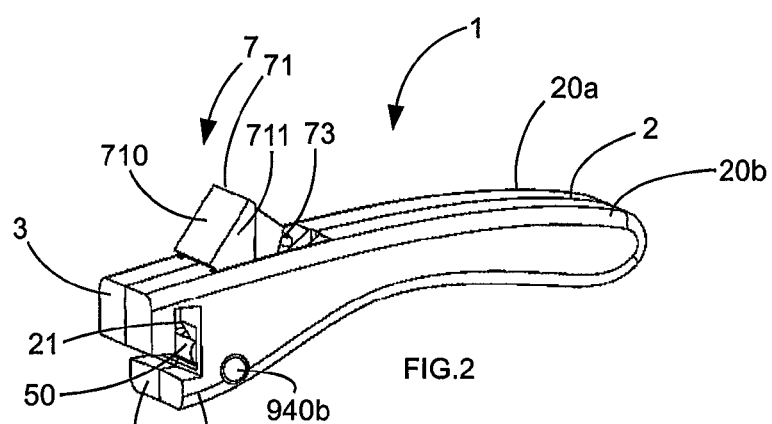
FIGS. 2 and 3 represent a perspective view of the device in FIG. 1 in the open and closed positions, respectively.
Figure 3:
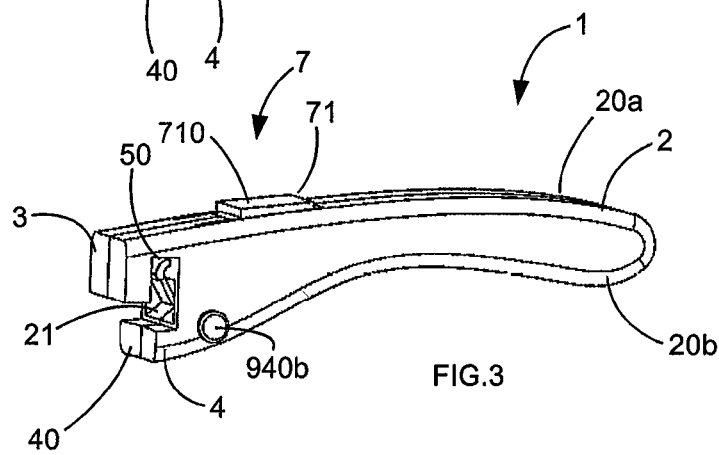
Figure 4:
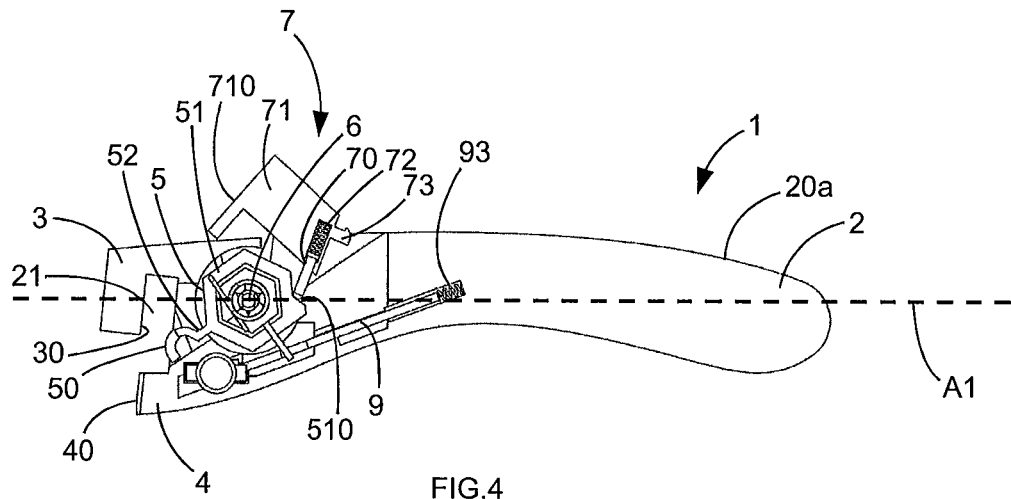
FIGS. 4 and 5 represent a lateral view of part of the device in FIG. 3, open along a median plane, with the internal mechanisms to the device, in the open and locked positions, respectively.
Figure 5:
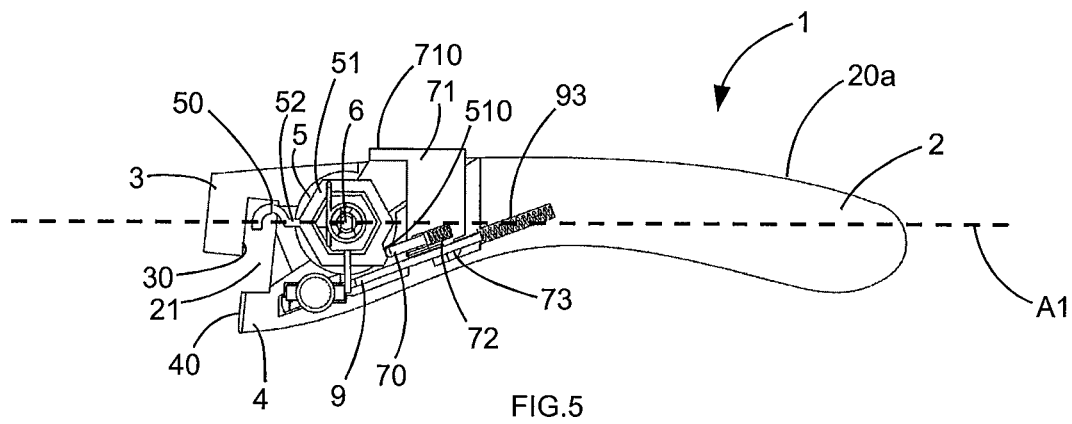
Figure 6:
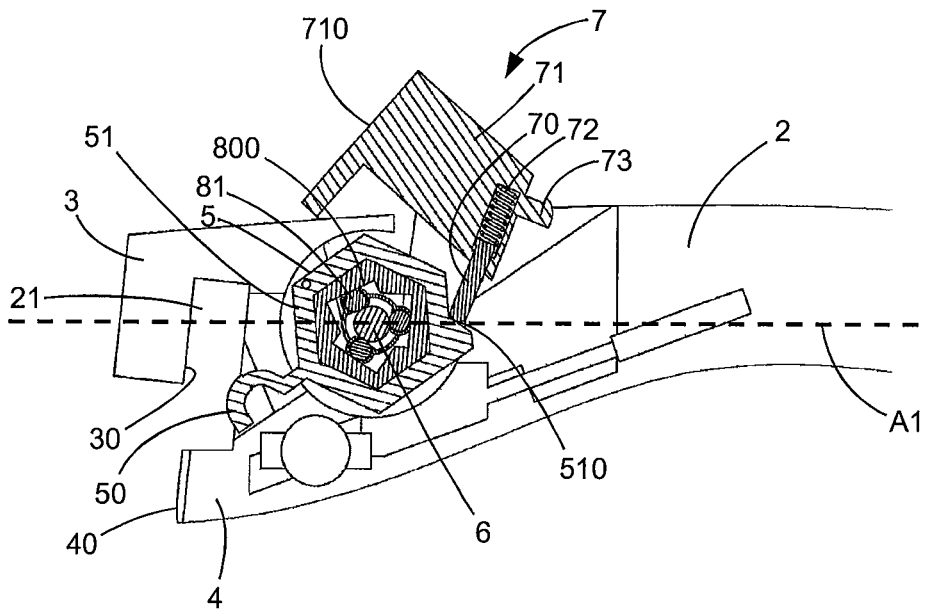
FIGS. 6, 7 and 8 represent another lateral cross section of the front portion of the device in FIG. 1 in an open position, in a tightening position, and in a locked position, respectively.
Figure 7:
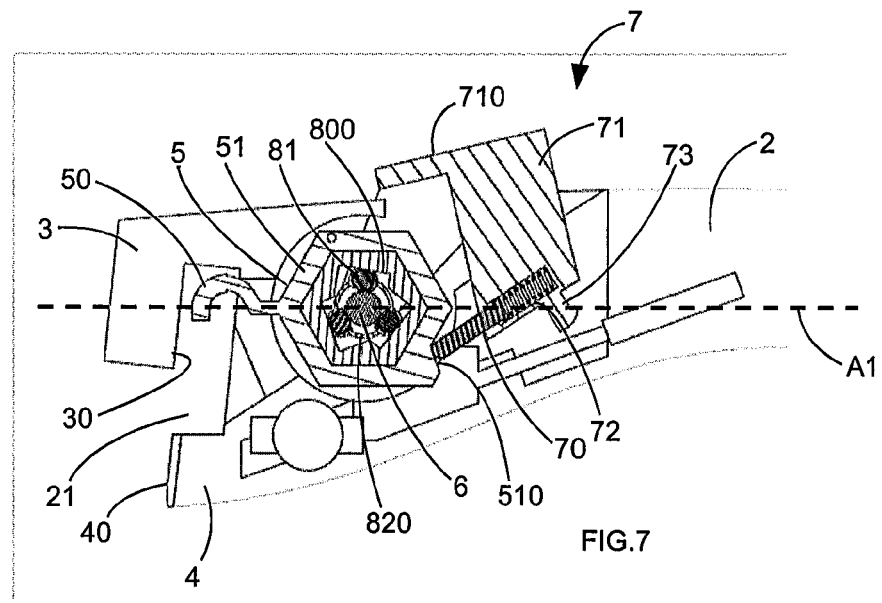
Figure 8:
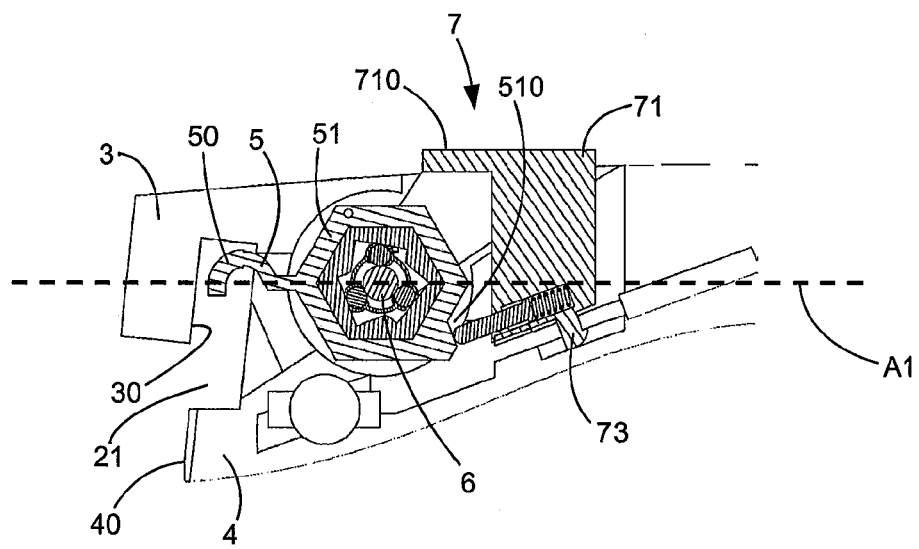

Tightening arm 5 rotates around axis 6 between an unlocked position, shown in FIGS. 2, 4 and 6, and a locked position, shown in FIGS. 3, 5 and 8. In the unlocked position, front support element 50 is housed at least partially within a recess located in front of gripping body 2, in the bottom of housing 21, in such a way as to free housing 21 to accommodate the vessel wall. In the locked position, front support element 50 is in contact with upper arm 3 to work with it to lock the lateral vessel wall and pin this wall against upper arm 3, as will be described below.

Rear support ledge 510 is designed to work with finger tappet 70 of movement element 7.

Movement element 7 also includes control button 71 mounted to pivot around axis 6 between an open and a closed position. Control button 71 has upper support surface 710, on which a user is supposed to exert a manual force in the closing direction with, for example, a finger, and two lateral arm supports 711 mounted to rotate around axis 6. Finger tappet 70 is mounted on control button 71 via return spring 72. It is attached to and rotates with control button 71. Finger tappet 70 pushes against support ledge 510 of ring 51. In use, pivoting control button 71 from its open position to its closed position rotates ring 51 via finger tappet 70, which pushes ledge 510. Control button 71 also contains lower hooking head 73, which extends from under control button 71 in the closed position and which is designed to lock control button 71 in that position, as will be explained below.

Movement element 7 is connected to gripping body 2 via helical torsion spring 74 which surrounds axis 6. Spring 74 has a first fixation end in support against stop 712, provided on the internal face of one of the support arms 711, and a second end fixed and attached to the gripping body 2. Torsion spring 74 acts to return the movement element 7 to the open position.

Gripping device 1 also includes anti-return system 8. This anti-return system 8 has ring 80, rollers 81 (in this case, three rollers 81), support piece 82 and helical torsion spring 83.

Ring 80 has a hexagonal external periphery with six external faces and is shaped to fit in ring 51. Henceforth the ring 51 shall be called the "external ring" and the ring 80 shall be called the "internal ring". The interior of ring 80 has three internal blockage surfaces 800 which extend in relation to three, non-contiguous external faces, respectively, of ring 80. Each of blockage surfaces 800 is slightly inclined relative to the corresponding external face. In other words, the blockage surface 800 and the corresponding external face are not parallel. This incline is designed to block rollers 81 by pinching them between axis 6 and the associated blockage surface 800.

Support piece 82 is mounted on axis 6. It has a cage 820 for supporting the rollers 81. Cage 820 is mounted inside internal ring 80 and around axis 6. Rollers 81 have a cylindrical shape with a transverse axis (i.e., orthogonal to median plane PM and, therefore, parallel to axis 6). Each roller 81 is held in a housing located between inclined blockage internal face 800 of internal ring 80 and axis 6. Depending on the position of support cage 820 relative to ring 80, roller 81 is either free to rotate within its housing, or is blocked from rotating by being pinched, or buttressed, between blockage surface 800 and fixed axis 6.

The incline of surfaces 800 is designed so that rollers 81 block by pinching the rotation of internal ring 80 in the opposite direction from the tightening direction, as will be explained below.

Support cage 820 is attached to support element 821 of spring 83. Spring 83 surrounds axis 6. It is attached at one an of its ends 830 to external ring 51 and its other end 831 pushes against stop 822 mounted on support element 821. The role of spring 83 is to hold rollers 81 in contact with inclined surfaces 800 when tightening arm 5 is rotated in the tightening direction, from the unlocked to the locked position.

Rollers 81, support cage 820, axis 6 and ring 80 constitute the elements of a free wheel. This wheel may act as a controlled free wheel, the elements of which may be manufactured by RINGSPANN®.

Support piece 82 is also attached to finger 823 which is designed to move locking piece 9 in translation when piece 82 rotates.

Locking piece 9 is a rectangular sheet which extends below tightening arm 5. Locking piece 9 houses rear traversal opening 90, or hole, to accept lower hooking head 73, forward lateral notch 91 to accept finger 823 and, on its front extremity, unblocking transverse slide 92.

Locking piece 9 is mobile and moves, within gripping device 1, in translation between an unlocked rear position shown in FIG. 4 and a forward locked position shown in FIG. 5. Locking piece 9 is linked to gripping device 1 by return spring 93, which returns locking piece 9 to the unlocked position.

Device 1 also includes two unblocking elements 94a and 94b designed to work with locking piece 9 to unblock anti-return system 8. Locking piece 9 and elements 94a and 94b form an unblocking member of anti-return system 8. Each item 94a (94b) has manual control button 940a (940b) and inclined surface 941a (941b). Two inclined surfaces 941a and 941b, which face one another, are symmetric to one another relative to median plane PM of body 2 and incline away from one another at the rear. When locking piece 9 is in the forward locking position, inclined surfaces 941a and 941b are, in front, in contact with the two extremities of slide 92 and buttons 940a and 940b project laterally from gripping body 2. In this position, when a user pushes buttons 940a and 940b into the interior of device 1, this locks piece 9 by moving to the rear, via inclined surfaces 941a and 941b acting on slide 92. The rearward movement of locking piece 9 causes finger 823 to rotate, which unblocks anti-return system 8, as will be explained below.

The mounting of gripping device 1 on the lateral wall of a cooking vessel and the removal thereof therefrom will now be described, with reference to FIGS. 4-8.

Initially, gripping device 1 in the open position as shown in FIGS. 4 and 6. In this position:
 control button 71 is in the open position, above gripping body 2, because of the return action of spring 74;
 tightening arm 5 is in the unlocked position, forward support element 50 is located in the bottom of housing 21, next to lower arm 4;
 locking piece 9 is in a rear, unlocked position because of the return action of spring 93.

To mount gripping device 1 on the lateral wall of a cooking vessel, the user adjusts device 1 to insert the lateral vessel wall into housing 21 and to place the internal face of the vessel wall against internal support surface 30 of upper arm 3 and the vessel wall's external face against external support surface 40 of lower arm 4.

The user then pushes support surface 710 of control button 71 to pivot it around axis 6 in a closing direction, against the return action of spring 74.

Through finger tappet 70, the rotation of control button 71 causes tightening arm 5 to rotate around axis 6, in the tightening direction, from an unlocked to a locked position. In the locked position, front support element 50 is in contact with upper arm 3 and the lateral vessel wall is inserted between internal support surface 30 of arm 3 and front support element 50.

In this position, tightening arm 5 works with two lower and upper arms 3 and 4 to pin the lateral vessel wall against two arms 3 and 4. Front support element 50 pins the vessel wall against internal support upper arm 3.

The rotation of tightening arm 5 is accompanied by the rotation of external ring 51 in the tightening direction.

The rotation of external ring 51 in the tightening direction causes the rotation in the same direction of
internal ring 80 and
support piece 82, due to the action of spring 83.

Spring 83 also maintains a simple, permanent contact between rollers 81 and internal ring 80. In this rotation direction of tightening arm 5 (and therefore of rings 51 and 80), however, the rollers can roll freely between support piece 82 and internal ring 80. Rotation in the opposite direction from the tightening direction of internal ring 80, and therefore of tightening arm 5, would be impossible since rollers 81 are pinched against axis 6 by inclined surfaces 800. Therefore, the anti-return system is designed to block the rotation of the tightening arm in the opposite direction from the tightening direction when the tightening arm is rotated from the unlocked to the locked position.

The rotation of support piece 82 moves locking piece 9 forward in translation, via finger 823 positioned in notch 91, against the return action of spring 93, to the forward locking position.

Once tightening arm 5 reaches its tightening position, springs 72 and 74 continue to compress under the manual pushing action of the user until control button 71 reaches its closed position. In this position, hooking head 73 enters opening 90 of locking piece 9 to lock it closed.

In the locked position, it is impossible for tightening arm 5 to rotate in the opposite direction from the tightening direction because of rollers 81, which are then pinched against axis 6 by inclined surfaces 800. Here, it should be noted that the blockage is not based on compression of an elastic element, but on a pinching effect triggered when the tightening arm is rotated in the opposite direction from the tightening direction. Therefore, no play occurs in the event of shock.

To remove gripping device 1, the user puts manual pressure on each of two lateral buttons 94a and 94b to force them inside body 2. This pressure is applied to the lateral extremities of slide 92 via inclined surfaces 941a and 941b. The incline of inclined surfaces 941a and 941b creates a force with a longitudinal component which expulses locking piece 9 to the rear. The unblocking member is therefore displaced from a blockage position, in which rollers 81 are in contact with surfaces 800, to an unblocking position, in which rollers 81 are released, without contact with surfaces 800.

The movement of locking piece 9 in rearward translation causes, through finger 823, a slight rotation of support piece 82 in the opposite direction from the tightening direction. This releases rollers 81 and, as a result, frees tightening arm 5 to rotate in the opposite direction from the tightening direction, which corresponds to the direction to open the gripping device.

Opening is completed by the action of springs 93 and 74. Spring 93 returns locking piece 9, which moves in rearward translation until it reaches the unlocked position. Torsion spring 74, which is attached to gripping body 2, returns control button 71 to the open position.

Finger tappet 70 no longer pushes on ring 51 so that tightening arm 5, which can now rotate in the opposite direction from the tightening direction, returns to the unlocked position.

Rollers 81 could be replaced by other rolling elements, e.g., ball bearings, which can block the rotation of internal ring 80 in the opposite direction from the tightening direction by pinching. In this case, ring 80 would have housings fitted to these rolling elements. Ring 80 and rolling elements 81 could also be replaced by any other free wheel mechanism.

The anti-return system could also include any other type of mechanism designed to block the rotation of tightening arm 5 in the opposite direction from the rotation direction when arm 5 is in the locked position and possibly during tightening.

It should be emphasized that gripping device 1 as just described generates a tightening force that has a parallel vertical component. As a result, the tightening effort necessary can be reduced. Furthermore, it has a continuous anti-return system which eliminates play when sautéing or flipping crêpes. This limits wear and tear of the vessel coating, without sacrificing locking security.

The invention claimed is:

1. Removable gripping device for a cooking vessel; said vessel contains a lateral wall, which has:
   an internal support upper arm and an external support lower arm, designed to work together so that, in the grip position, the upper arm and the lower arm push against an internal face and an external face of the lateral wall, respectively;
   a tightening arm which rotates around an axis between an unlocked and a locked position, in which the tightening arm pushes against the lateral wall and works with one of the upper and lower arms, to pin the lateral wall against at least one of the upper and lower arms;
   a movement mechanism designed to be manually shifted between an open position and a closed position to rotate the tightening arm when moving from the open position to the closed position;
   which includes an anti-return mechanism, which is separate from the movement mechanism, designed to block the rotation of the tightening arm in the opposite direction from the tightening direction when said tightening arm is in the locked position.

2. Device based on claim 1, which includes an unblocking member designed to be manually moved to shift the anti-return mechanism from a blockage to an unblocking position.

3. Device based on claim 1, in which the anti-return mechanism operates by buttressing.

4. Device based on claim 1, in which the anti-return mechanism includes a free wheel device.

5. Device based on claim 1, in which the anti-return mechanism is designed to block the rotation of the tightening arm in the opposite direction from the tightening direction when the tightening arm is rotated from the unlocked to the locked position.

6. Device based on claim 1, in which the anti-return mechanism includes rolling elements between the rotation axis of the tightening arm, where said axis is fixed, and a ring, which is attached to and rotates with the tightening arm and is designed to have its rotation blocked in the opposite direction from the tightening direction by a pinching action of rolling elements between the ring and the rotation axis.

7. Device based on claim 6, in which rolling elements are mounted on a cage linked to the tightening arm by a connection mechanism designed to cause the cage to rotate when the tightening arm is rotated from its unlocked to its locked position.

8. Device based on claim 7, in which the connection mechanism between the tightening arm and the cage includes elastic mechanisms under the action of which the rolling elements are kept in contact with ring when the tightening arm is rotated from its unlocked to its locked position.

9. Device based on claim 7, in which a locking piece, which is designed to work with a finger, which is attached to the cage, so that, when the tightening arm is rotated from its unlocked to its locked position, the finger, which also rotates, moves said locking piece in translation in a first direction to a locking position in which said locking piece locks the movement mechanism in the closed position.

10. Device based on claim 9, wherein the locking piece forms an opening positioned so as to receive a hooking head attached to the movement mechanism when the locking piece is in a locked position.

11. Device based on claim 9, wherein an unblocking member is designed to cause the locking piece to move in translation in a second direction causing, via the finger, the cage to rotate to disengage the rolling elements, the disengagement of the rolling elements releasing the tightening arm to rotate in the opposite direction from the tightening direction.

12. Device based on claim 11, wherein the device further comprises first elastic return mechanisms, which are designed to return the locking piece in the second direction, wherein the return of the locking piece in the second direction releases the hooking head.

13. Device based on claim 12, wherein the device further comprises second elastic return mechanisms designed to return the movement mechanism to the open position after releasing the hooking head.

14. Device based on claim 6, in which the rolling elements are rollers.

15. Device based on claim 6, in which the rolling elements are ball bearings.

16. Device based on claim 1, in which the movement mechanism includes a finger tappet via which said movement mechanism is designed to cause the tightening arm to rotate in the tightening direction.

17. Device in based on claim 16, wherein the finger tappet is connected to the movement mechanism via an elastic mechanisms.

18. Device based on claim 1, in which the tightening arm is designed for pinning the vessel wall against the internal support upper arm.

19. A vessel comprising a cooking vessel body and the gripping device of claim 1.

* * * * *